United States Patent
Nakamura et al.

(10) Patent No.: US 9,869,288 B2
(45) Date of Patent: Jan. 16, 2018

(54) IGNITION CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Satoshi Nakamura, Toyota (JP); Tomohiro Nakano, Nagoya (JP); Shunichi Takeda, Tariya, Aichi-pref. (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/083,866

(22) Filed: Mar. 29, 2016

(65) Prior Publication Data

US 2016/0305392 A1 Oct. 20, 2016

(30) Foreign Application Priority Data

Apr. 15, 2015 (JP) .................. 2015-083555

(51) Int. Cl.
*F02P 5/15* (2006.01)
*F02P 3/05* (2006.01)

(52) U.S. Cl.
CPC ............. *F02P 5/1502* (2013.01); *F02P 3/051* (2013.01); *F02D 2200/101* (2013.01); *Y02T 10/46* (2013.01)

(58) Field of Classification Search
CPC .... F02P 1/086; F02P 3/051; F02P 5/00; F02P 5/1502; F02P 5/1504; F02P 5/1551; F02P 9/002; Y02T 10/46

USPC .... 123/406.19, 609, 618, 620; 701/105, 111
See application file for complete search history.

(56) References Cited

U.S. PATENT DOCUMENTS

| 3,881,458 A | 5/1975 | Roozenbeek et al. | |
|---|---|---|---|
| 5,896,842 A * | 4/1999 | Abusamra | F02P 5/152 123/406.39 |
| 2002/0056445 A1* | 5/2002 | Inagaki | F02P 3/0456 123/609 |
| 2015/0316018 A1* | 11/2015 | He | F02P 9/002 315/209 CD |

(Continued)

FOREIGN PATENT DOCUMENTS

| JP | H10-184520 A | 7/1998 |
|---|---|---|
| JP | 2014-206061 A | 10/2014 |

(Continued)

*Primary Examiner* — John Kwon
*Assistant Examiner* — Johnny H Hoang
(74) *Attorney, Agent, or Firm* — Oliff PLC

(57) ABSTRACT

An ECU outputs an ignition signal Si to an ignition apparatus through an ignition communication line. The ignition apparatus performs the closing operation of an ignition switching element, in a period during which the ignition signal Si is input. The ECU outputs a discharge waveform control signal Sc to a waveform control communication line, at a timing that is delayed by a predetermined delay time relative to an output timing of the ignition signal Si. In an input period of the discharge waveform control signal Sc after the stop of the input of the ignition signal Si, the ignition apparatus controls the electric current to flow through a primary coil, to a discharge current command value that is decided depending on the above delay time, by the opening-closing operation of a control switching element.

4 Claims, 6 Drawing Sheets

(56) References Cited

U.S. PATENT DOCUMENTS

2016/0047352 A1     2/2016   Nakayama et al.
2016/0084215 A1*   3/2016   Kondou ................ F02P 3/0435
                                                                            123/620
2017/0022960 A1     1/2017   Takeda et al.

FOREIGN PATENT DOCUMENTS

JP         2015-206355 A    11/2015
WO       2014/168244 A1    10/2014

* cited by examiner t1-t3 t3-t4 t4-t5 t5-t6

| NE | LOW ←——————————→ HIGH |
|---|---|
| I2* | SMALL ←——————————→ LARGE |

| I2* | SMALL ←——————————→ LARGE |
|---|---|
| Td | SHORT ←——————————→ LONG |

IGNITION CONTROL SYSTEM FOR INTERNAL COMBUSTION ENGINE

INCORPORATION BY REFERENCE

The disclosure of Japanese Patent Application No. 2015-083555 filed on Apr. 15, 2015 including the specification, drawings and abstract is incorporated herein by reference in its entirety.

BACKGROUND

1. Field of the Invention

The invention relates to an ignition control system for an internal combustion engine that controls the discharge current of a spark plug after the discharge of the spark plug is started.

2. Description of Related Art

As this kind of ignition control system, for example, there is a system described in Japanese Patent Application Publication No. 2014-206061. In the system, an ignition signal is output from a control apparatus (ECU) to an ignition apparatus, and thereby, the energization of a primary coil is performed. Then, when the output of the ignition signal is stopped, the energization of the primary coil is stopped, and therefore, a counter electromotive force is generated in a secondary coil. Thereby, the spark plug is discharged. After the stop of the output of the ignition signal, the ECU outputs an energy input period signal to the ignition apparatus. The ignition apparatus controls the discharge current of the spark plug, in a period during which the energy input period signal is input.

SUMMARY

By the way, the discharge current value necessary to maintain the ignition performance of an air-fuel mixture in a combustion chamber of an internal combustion engine can fluctuate depending on the operational state of the internal combustion engine. Therefore, for reducing energy consumption as much as possible while maintaining the ignition performance, it is desirable that the discharge current value can be variably set as well as the timing when the control of the discharge current is finished. However, in the above system, when a signal for commanding the discharge current value is sent from the ECU to the ignition apparatus, it is necessary to add a communication line that connects the ECU and the ignition apparatus.

The invention provides an ignition control system for an internal combustion engine that allows for the instruction of the discharge current value from the control apparatus to the ignition apparatus and that suppresses the increase in the number of communication lines.

1. An ignition control system for an internal combustion engine includes: an ignition apparatus including an ignition coil that is provided with a primary coil and a secondary coil, a spark plug that is connected with the secondary coil and that is exposed in a combustion chamber of the internal combustion engine, a discharge control circuit that continues discharge of the spark plug after a start of the discharge of the spark plug, and a discharge control unit that controls discharge current of the spark plug by operating the discharge control circuit, after the start of the discharge of the spark plug; a control apparatus; an ignition communication line that transmits an ignition signal from the control apparatus to the ignition apparatus; and a waveform control communication line that transmits a discharge waveform control signal from the control apparatus to the ignition apparatus, the ignition signal being a signal that commands energization of the primary coil, the discharge waveform control signal being a signal that commands a finish timing of the control of the discharge current by the discharge control unit, by an input stop timing to the ignition apparatus, and the control apparatus variably controlling a discharge current value by variably setting a delay time of an input timing of the discharge waveform control signal to the ignition apparatus relative to an input timing of the ignition signal to the ignition apparatus, the discharge current value being a value that is controlled by the discharge control unit depending on the delay time.

In the above configuration, the control apparatus variably sets the delay time of the input timing of the discharge waveform control signal to the ignition apparatus relative to the input timing of the ignition signal to the ignition apparatus. Then, the discharge control unit operates the discharge control circuit depending on the delay time, and thereby, variably controls the discharge current value. Here, the discharge waveform control signal is also a signal that commands the finish timing of the control of the discharge current. Therefore, in the above configuration, it is possible to transmit the command of the finish timing of the control of the discharge current and the command of the discharge current value, through the waveform control communication line. Accordingly, it is possible to suppress the increase in the number of communication lines, while allowing for the instruction of the discharge current value from the control apparatus to the ignition apparatus.

2. In the ignition control system for the internal combustion engine according to the above 1, when the delay time is long, the discharge control unit controls the discharge current value to a larger value than when the delay time is short, and when rotation speed of the internal combustion engine is high, the control apparatus sets the delay time to a longer time than when the rotation speed of the internal combustion engine is low.

In the above configuration, when the rotation speed is high, the discharge control unit controls the discharge current value to a larger value than when the rotation speed is low. Here, when the rotation speed is high, the airflow in the combustion chamber increases. Therefore, when the discharge current value is small, a discharge stop is likely to occur. In this regard, the above configuration controls the discharge current value to a larger value, when the rotation speed is high. Thereby, it is possible to suppress the occurrence of the discharge stop, and further, it is possible to suppress the decrease in the ignitability when the rotation speed of the internal combustion engine is high.

3. In the ignition control system for the internal combustion engine according to the above 2, when the delay time is long, the discharge control unit controls the discharge current value to a larger value than when the delay time is short, and when the discharge waveform control signal is input twice to the ignition apparatus in a period during which the ignition signal is input to the ignition apparatus, the discharge control unit controls the discharge current value depending on a delay time of a timing when the discharge waveform control signal is input at the second time relative to the input timing of the ignition signal. Further, when the rotation speed of the internal combustion engine is high, the control apparatus sets the delay time to a longer time than when the rotation speed of the internal combustion engine is low, and the control apparatus outputs the discharge waveform control signal again after stopping output of the discharge waveform control signal, with a condition that the rotation speed rises after the output of the discharge waveform control signal in an output period of the ignition signal.

In the above configuration, when the rotation speed of the internal combustion engine is high, the control apparatus sets the delay time to a longer time than when the rotation speed of the internal combustion engine is low. Therefore, when the rotation speed is low, the control apparatus outputs the discharge waveform control signal early. Thereafter, when the rotation speed rises sharply, the control apparatus stops the output of the discharge waveform control signal once, and thereafter, outputs the discharge waveform control signal again. Meanwhile, when the discharge waveform control signal is input twice while the ignition signal is input, the discharge control unit controls the discharge current value, depending on the delay time of the timing when the discharge waveform control signal is input at the second time relative to the input timing of the ignition signal. Therefore, even when the rotation speed rises sharply, the discharge control unit can control the actual discharge current value to a discharge current value that is appropriate to a rotation speed after the sharp rise. Particularly, when the rotation speed is high, the airflow in the combustion chamber becomes faster than when the rotation speed is low, and thereby, the ignitability is likely to decrease. Therefore, to be capable of controlling the actual discharge current value to a discharge current value that is appropriate to a high rotation speed means to be capable of suitably suppressing the decrease in the ignitability.

4. In the ignition control system for the internal combustion engine according to any one of the above 1 to 3, the internal combustion engine gives motive power to a driving wheel of a vehicle. In the above configuration, since the internal combustion engine gives the motive power to the driving wheel, there is a fear that the rotation speed of the internal combustion engine rises sharply at the time of the operation of a brake of the vehicle, the running on a rough road, or the like. Therefore, the setting of the relation between the delay time and the discharge current value according to the above 2 is particularly effective.

5. In the ignition control system for the internal combustion engine according to any one of the above 1 to 4, the ignition apparatus includes an ignition switching element that opens and closes a first loop circuit, the first loop circuit including the primary coil and an electric power source, the ignition signal commands a closing operation period of the ignition switching element, the discharge control circuit includes a control switching element that opens and closes a second loop circuit, the second loop circuit including the primary coil, the electric power source, and a booster circuit that boosts voltage of the electric power source, the discharge control unit controls the discharge current value by opening-closing operation of the control switching element, and the electric power source is connected with an identical terminal of the primary coil, in both of the first loop circuit and the second loop circuit.

In the above configuration, the closing operation of the ignition switching element is performed by the ignition signal, so that the first loop circuit becomes a closed-loop circuit and the energization of the primary coil is performed. Thereafter, the opening operation of the ignition switching element is commanded by the ignition signal, so that the first loop circuit becomes an open loop and the energization of the primary coil is stopped. Thereby, a counter electromotive force to prevent the decrease in the magnetic flux generated by the energization of the primary coil is generated in the secondary coil, and thereby, the discharge of the spark plug is performed. Thereafter, when the discharge control unit performs the closing operation of the control switching element, the second loop circuit becomes a closed-loop circuit, and an electric current in the opposite direction to an electric current when the closing operation of the ignition switching element was performed flows through the primary coil. The electric current decreases the magnetic flux generated when the closing operation of the ignition switching element was performed. Therefore, the decrease rate of the above magnetic flux is controlled by the operation of the control switching element. Thereby, it is possible to suppress the decrease in the discharge current value, or increase the discharge current value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
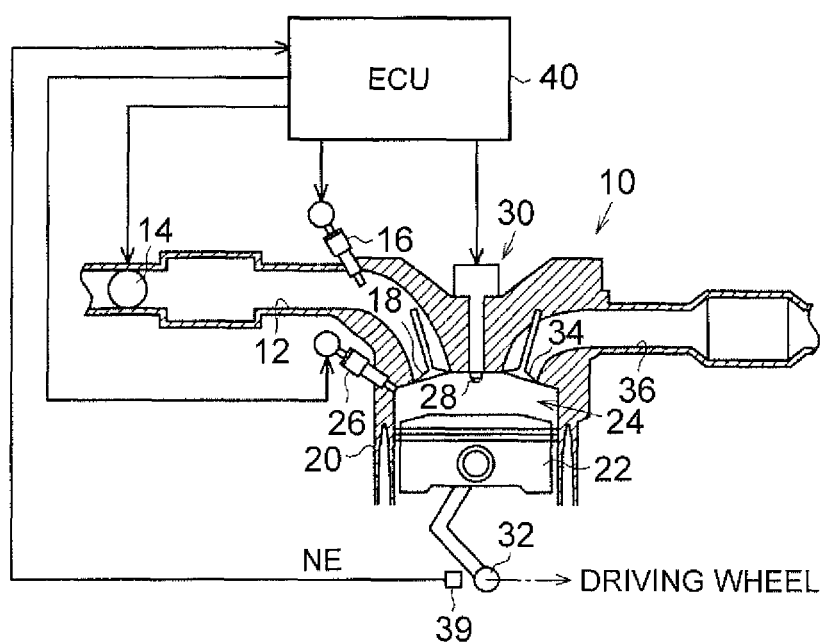
FIG. 1 is a diagram showing a configuration of an engine system that includes an ignition control system according to a first embodiment.

Hereinafter, an embodiment of an ignition apparatus will be described with reference to the drawings. An internal combustion engine 10 shown in FIG. 1 is a spark-ignition multi-cylinder internal combustion engine. In an intake passage 12 of the internal combustion engine 10, an electronically-controlled throttle valve 14 capable of varying the cross-section area of the passage is provided. On the downstream side of the intake passage 12 relative to the throttle valve 14, a port injection valve 16 to inject fuel to an intake port is provided. By the valve opening operation of an intake valve 18, the air in the intake passage 12 and the fuel injected from the port injection valve 16 are filled into a combustion chamber 24 that is formed by a cylinder 20 and a piston 22. The combustion chamber 24 faces an injection port of a cylinder injection valve 26, and by the cylinder injection valve 26, the fuel can be injected and fed directly to the combustion chamber 24. In the combustion chamber 24, a spark plug 28 of an ignition apparatus 30 protrudes. Then, by the spark ignition of the spark plug 28, an air-fuel mixture of the air and the fuel is ignited, and the air-fuel mixture is supplied for combustion. Some of the combustion energy of the air-fuel mixture is converted into the rotational energy of a crankshaft 32, through the piston 22. To the crankshaft 32, a driving wheel of a vehicle can be mechanically linked. Here, in the embodiment, it is assumed that the vehicle is a vehicle in which only the internal combustion engine 10 gives motive power to the driving wheel.

By the valve opening operation of an exhaust valve 34, the air-fuel mixture supplied for combustion is ejected to an exhaust passage 36, as exhaust gas. An electronic control unit (ECU) 40 is a control apparatus that controls the internal combustion engine 10. The ECU 40 takes in output values of various sensors such as a crank angle sensor 39 that detects rotation speed NE of the crankshaft 32. Then, based on the taken output values, the ECU 40 operates various actuators such as the throttle valve 14, the port injection valve 16, the cylinder injection valve 26 and the ignition apparatus 30.

Figure 2:
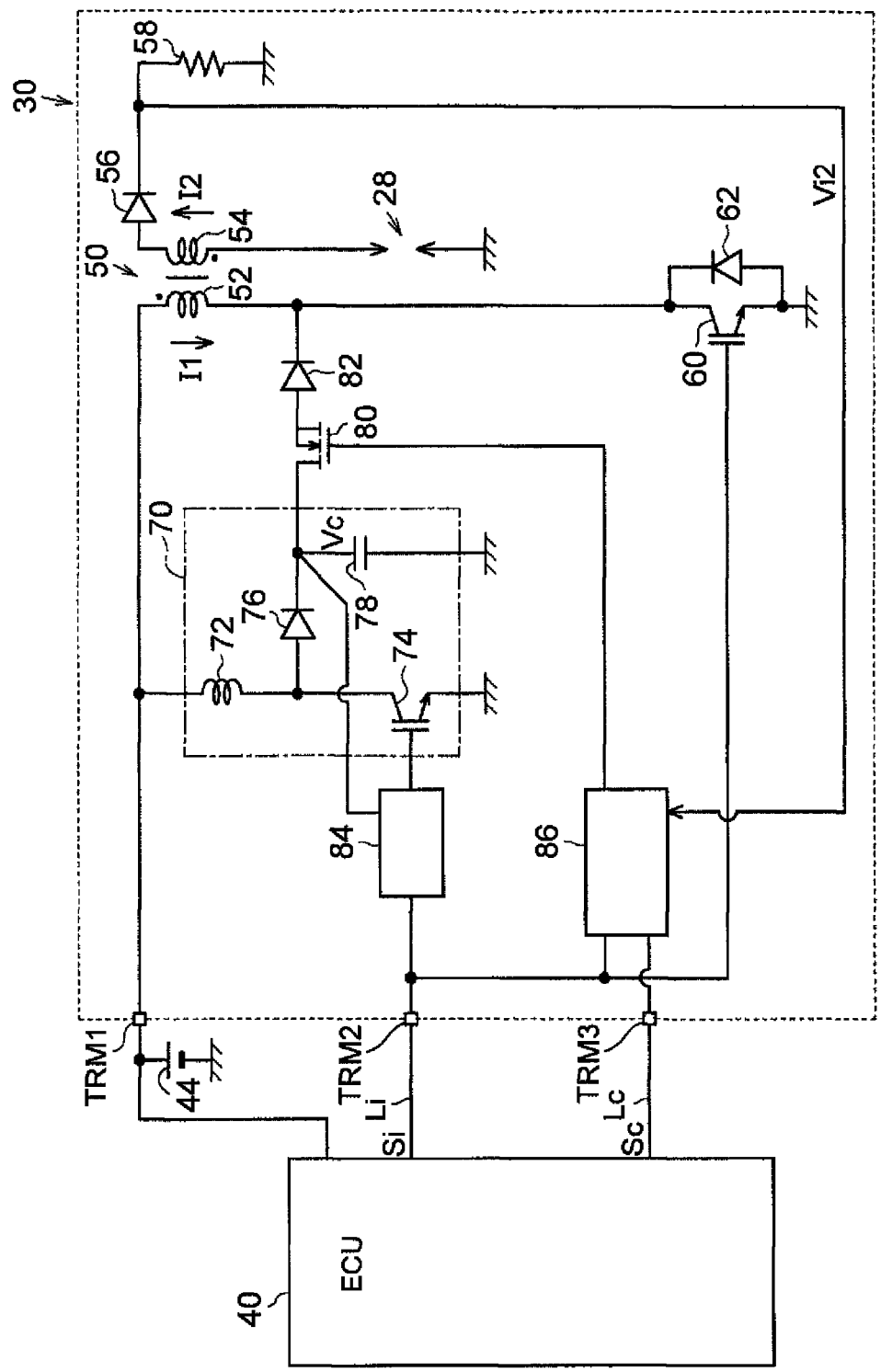
FIG. 2 is a circuit diagram showing a circuit configuration of the ignition control system according to the embodiment.

FIG. 2 shows a circuit configuration of the ignition apparatus 30. As shown in FIG. 2, the ignition apparatus 30 includes an ignition coil 50 in which a primary coil 52 and a secondary coil 54 are magnetically coupled. Here, in FIG. 2, the black circles marked at one of a pair of terminals of the primary coil 52 and one of a pair of terminals of the secondary coil 54 show terminals at which the polarities of electromotive forces to be generated in the primary coil 52 and the secondary coil 54 are equal to each other when the magnetic fluxes interlinked with the primary coil 52 and the secondary coil 54 are changed in a state in which both ends of the primary coil 52 and both ends of the secondary coil 54 are opened.

One terminal of the secondary coil 54 is connected with the spark plug 28, and the other terminal is earthed through a diode 56 and a shunt resistor 58. The diode 56 is a rectifying element that permits the flow of electric current in a direction of going from the spark plug 28 through the secondary coil 54 to the earth and that restricts the flow of electric current in the opposite direction. The shunt resistor 58 is a resistor for detecting the electric current to flow through the secondary coil 54 by a voltage drop Vi2 of the shunt resistor 58. In other words, the shunt resistor 58 is a resistor for detecting the discharge current of the spark plug 28.

One terminal of the primary coil 52 of the ignition coil 50 is connected with a positive electrode of an external battery 44 through a terminal TRM1 of the ignition apparatus 30. Further, the other terminal of the primary coil 52 is earthed through an ignition switching element 60. Here, in the embodiment, the ignition switching element 60 is an insulated-gate bipolar transistor (IGBT). Further, with the ignition switching element 60, a diode 62 is connected in inverse parallel.

The electric power taken in from the terminal TRM1 is taken in also by a booster circuit 70. In the embodiment, the booster circuit 70 is configured by a boost chopper circuit. That is, the booster circuit 70 includes an inductor 72 having one end connected with the terminal TRM1 side, and the other end of the inductor 72 is earthed through a boost switching element 74. Here, in the embodiment, the boost switching element 74 is an IGBT. The anode side of a diode 76 is connected between the inductor 72 and the boost switching element 74, and the cathode side of the diode 76 is earthed through a capacitor 78. A charged voltage Vc of the capacitor 78 is the output voltage of the booster circuit 70.

A point between the diode 76 and the capacitor 78 is connected with a point between the primary coil 52 and the ignition switching element 60, through a control switching element 80 and a diode 82. In other words, an output terminal of the booster circuit 70 is connected with the point between the primary coil 52 and the ignition switching element 60, through the control switching element 80 and the diode 82. In the embodiment, the control switching element 80 is a MOS field-effect transistor. The above diode 82 is a rectifying element for blocking electric current from inversely flowing from the side of the primary coil 52 and the ignition switching element 60 to the side of the booster circuit 70 through a parasitic diode of the control switching element 80.

A boost control unit 84 is a drive circuit that controls the output voltage of the booster circuit 70 by performing the opening-closing operation of the boost switching element 74 based on an ignition signal Si input to a terminal TRM2. Here, the boost control unit 84 monitors the output voltage of the booster circuit 70 (the charged voltage Vc of the capacitor 78), and stops the opening-closing operation of the boost switching element 74, when the output voltage becomes a predetermined value or greater.

A discharge control unit 86 is a drive circuit that controls the discharge current of the spark plug 28 by performing the opening-closing operation of the control switching element 80 based on the ignition signal Si input to the terminal TRM2 and a discharge waveform control signal Sc input to a terminal TRM3.

The terminal TRM2 of the ignition apparatus 30 is connected with the ECU 40 through an ignition communication line Li, and the terminal TRM3 is connected with the ECU 40 through a waveform control communication line Lc. In a first mode of controlling the air-fuel ratio of the internal combustion engine 10 to a first target air-fuel ratio (a theoretical air-fuel ratio, here), the ECU 40 outputs the ignition signal Si through the ignition communication line Li, and does not output the discharge waveform control signal Sc to the waveform control communication line Lc. Further, in a second mode of controlling the air-fuel ratio to a second target air-fuel ratio that is leaner than the first target air-fuel ratio, the ECU 40 outputs the ignition signal Si through the ignition communication line Li, and outputs the discharge waveform control signal Sc through the waveform control communication line Lc. Here, in the embodiment, both of the ignition signal Si and the discharge waveform control signal Sc are pulse signals with a logic H.

Figure 3:
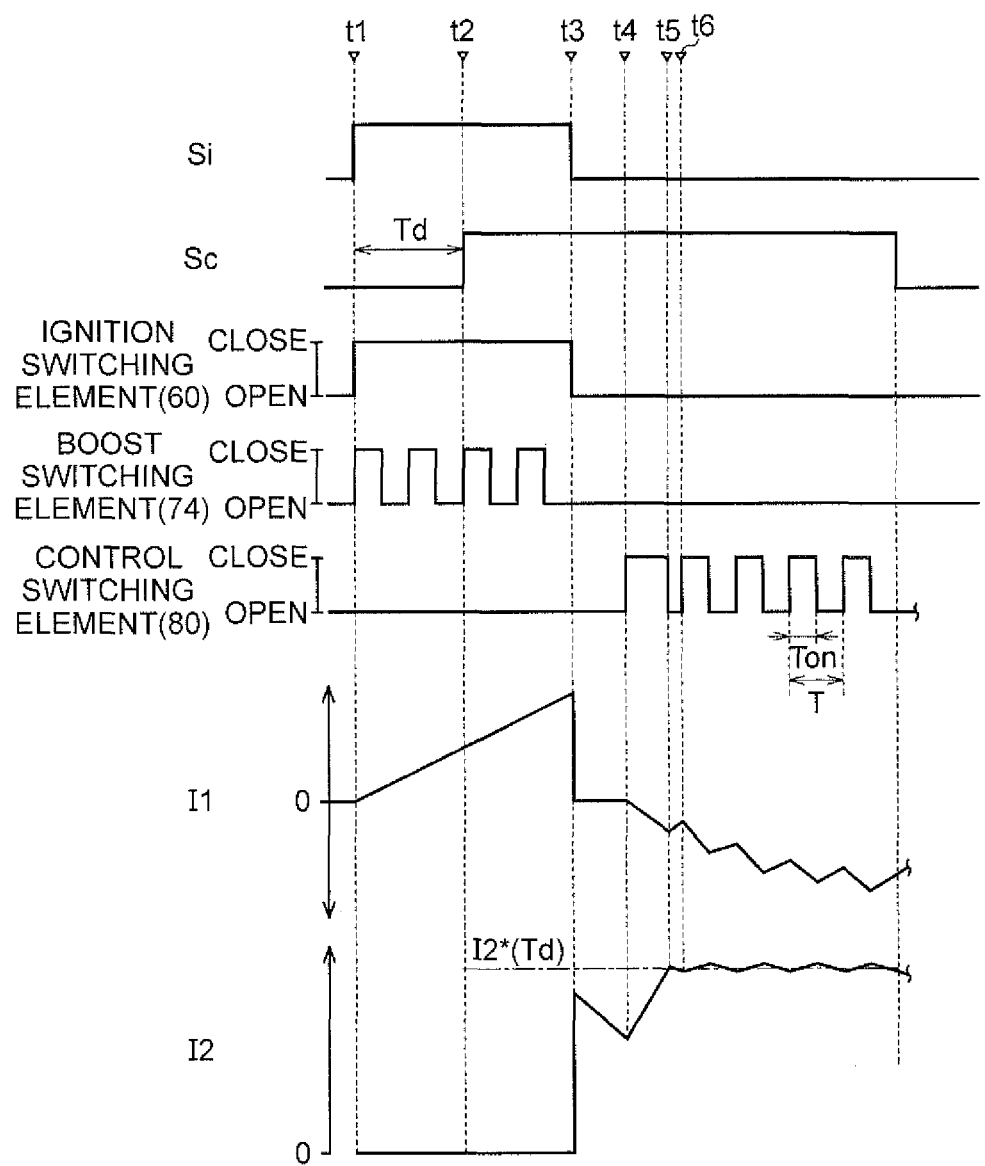
FIG. 3 is a timing chart exemplifying an ignition control according to the embodiment.

Next, particularly, a control in the second mode of an ignition control according to the embodiment will be exemplified with use of FIG. 3 and FIG. 4A to FIG. 4D. FIG. 3 shows the transition of the ignition signal Si, the transition of the discharge waveform control signal Sc, the state transition of the opening-closing operation of the ignition switching element 60, and the state transition of the opening-closing operation of the boost switching element 74. Further, FIG. 3 shows the state transition of the opening-closing operation of the control switching element 80, the transition of an electric current I1 to flow through the primary coil 52, and the transition of an electric current I2 to flow through the secondary coil 54. Here, as for the signs of the electric currents I1, I2, the sides of the arrows shown in FIG. 2 are defined to be positive.

Figure 4A:
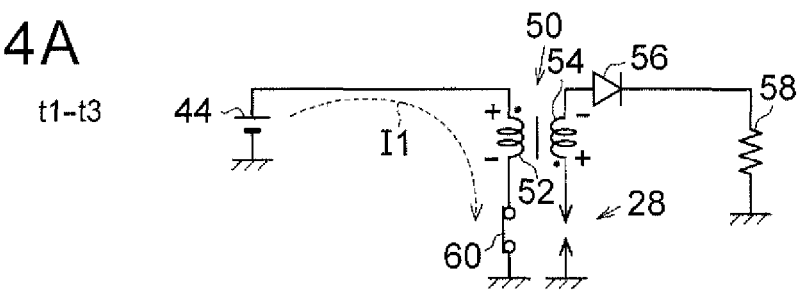
FIG. 4A is a circuit diagram exemplifying the ignition control according to the embodiment.

When the ignition signal Si is input to the ignition apparatus 30 at time t1, the ignition apparatus 30 performs the turning-on (closing) operation of the ignition switching element 60. Thereby, the electric current I1 to flow through the primary coil 52 gradually increases. FIG. 4A shows the route of the electric current to flow through the primary coil 52 at this time. As shown in FIG. 4A, when the closing operation of the ignition switching element 60 is performed, a first loop circuit that is a loop circuit including the battery 44, the primary coil 52 and the ignition switching element 60 becomes a closed-loop circuit, and the electric current flows through the circuit. Here, since the electric current to flow through the primary coil 52 gradually increases, the interlinkage magnetic flux of the secondary coil 54 gradually increases. Therefore, an electromotive force to cancel the increase in the interlinkage magnetic flux is generated in the secondary coil 54. However, the electromotive force makes the anode side of the diode 56 negative, and therefore, electric current does not flow through the secondary coil 54.

Further, as shown in FIG. 3, when the ignition signal Si is input to the ignition apparatus 30, the boost control unit 84 performs the opening-closing operation of the boost switching element 74. Thereafter, at time t2, which is the time when a delay time Td has elapsed from time t1 when the ignition signal Si was input to the ignition apparatus 30, the discharge waveform control signal Sc is input to the ignition apparatus 30.

Thereafter, when the input of the ignition signal Si is stopped at time t3, in other words, when the voltage of the ignition communication line Li is changed from the voltage of the logic H to the voltage of a logic L, the ignition apparatus 30 performs the opening operation of the ignition switching element 60. Thereby, the electric current I1 to flow through the primary coil 52 becomes zero, and by a counter electromotive force to be generated in the secondary coil 54, the electric current flows through the secondary coil 54. Thereby, the spark plug 28 starts the discharge.

Figure 4B:
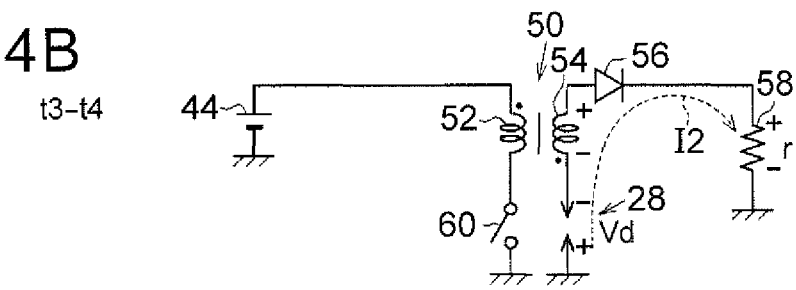
FIG. 4B is a circuit diagram exemplifying the ignition control according to the embodiment.

FIG. 4B shows the route of the electric current at this time. As shown in the figure, when the interlinkage magnetic flux of the secondary coil 54 begins to decrease by the interruption of the electric current of the primary coil 52, a counter electromotive force in the direction of cancelling the decrease in the interlinkage magnetic flux is generated in the secondary coil 54, and thereby, the electric current I2 flows through the spark plug 28, the secondary coil 54, the diode 56 and the shunt resistor 58. When the electric current I2 flows through the secondary coil 54, a voltage drop Vd is generated in the spark plug 28, and a voltage drop of "r·I2" corresponding to a resistance value r of the shunt resistor 58 is generated in the shunt resistor 58. Thereby, when the forward-directional voltage drop of the diode 56 and the like are ignored, a voltage of the sum "Vd+r·I2" of the voltage drop Vd in the spark plug 28 and the voltage drop in the shunt resistor 58 is applied to the secondary coil 54. The voltage gradually decreases the interlinkage magnetic flux of the secondary coil 54. The gradual decrease in the electric current I2 to flow through the secondary coil 54 from time t3 to time t4 in FIG. 3 is a phenomenon that is caused by the application of the voltage of "Vd+r·I2" to the secondary coil 54.

Figure 4C:
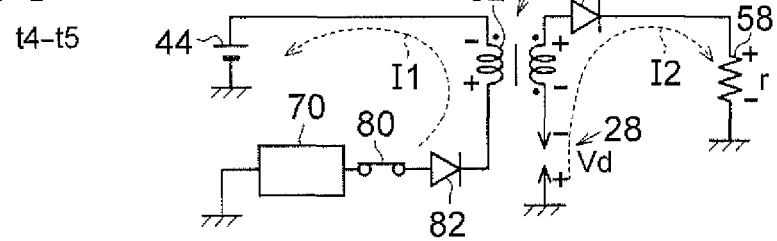
FIG. 4C is a circuit diagram exemplifying the ignition control according to the embodiment.

As shown in FIG. 3, after time t4, the discharge control unit 86 performs the opening-closing operation of the control switching element 80. FIG. 4C shows the electric current route in a period from time t4 to time t5 during which the control switching element 80 is in the closed state. Here, a second loop circuit that is a loop circuit including the booster circuit 70, the control switching element 80, the diode 82, the primary coil 52 and the battery 44 becomes a closed loop, and the electric current flows through the circuit.

Figure 4D:
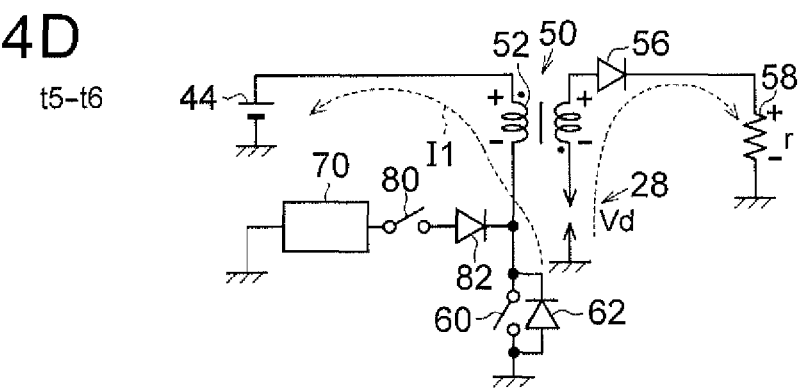
FIG. 4D is a circuit diagram exemplifying the ignition control according to the embodiment.

FIG. 4D shows the electric current route in a period from time t5 to time t6 during which the control switching element 80 is in the opened state. Here, a counter electromotive force to cancel the change in magnetic flux that is caused by the decrease in the absolute value of the electric current to flow through the primary coil 52 is generated in the primary coil 52. Thereby, a third loop circuit that is a loop circuit including the diode 62, the primary coil 52 and the battery 44 becomes a closed loop, and the electric current flows through the circuit.

Here, by operating a time ratio D of a closing operation period Ton to one cycle T of the opening-closing operation of the control switching element 80 shown in FIG. 3, it is possible to control the electric current to flow through the primary coil 52. The discharge control unit 86 executes a control to gradually increase the absolute value of the electric current I1 to flow through the primary coil 52, by the time ratio D. The electric current I1 in the period has the inverse sign to the electric current I1 to flow through the primary coil 52 when the ignition switching element 60 is in the closed state. Therefore, if the magnetic flux that is generated by the electric current I1 to flow through the primary coil 52 when the ignition switching element 60 is in the closed state is defined to be positive, the electric current I1 to be generated by the opening and closing of the control switching element 80 decreases the magnetic flux. Here, in the case where the gradual decrease rate of the interlinkage magnetic flux of the secondary coil 54 by the electric current I1 to flow through the primary coil 52 coincides with the gradual decrease rate when the voltage of "Vd+r·I2" is applied to the secondary coil 54, the electric current to flow through the secondary coil 54 does not decrease. In this case, the electric power loss by the spark plug 28 and the shunt resistor 58 is compensated by the electric power that is output by an electric power source constituted by the booster circuit 70 and the battery 44.

On the contrary, in the case where the gradual decrease rate of the interlinkage magnetic flux of the secondary coil 54 by the electric current I1 to flow through the primary coil 52 is lower than the gradual decrease rate when the voltage of "Vd+r·I2" is applied to the secondary coil 54, the electric current I2 to flow through the secondary coil 54 gradually decreases. By the gradual decrease in the electric current I2, the interlinkage magnetic flux gradually decreases at the gradual decrease rate when the voltage of "Vd+r·I2" is applied to the secondary coil 54. However, the gradual decrease rate in the electric current I2 to flow through the secondary coil 54 is lower compared to the case where the absolute value of the electric current I1 to flow through the primary coil 52 does not gradually increase.

Further, in the case where the absolute value of the electric current I1 to flow through the primary coil 52 is gradually increased such that the gradual decrease rate of the actual interlinkage magnetic flux is higher than the gradual decrease rate of the interlinkage magnetic flux of the secondary coil 54 when the voltage of "Vd+r·I2" is applied to the secondary coil 54, the voltage of the secondary coil 54 becomes high by a counter electromotive force to suppress the decrease in the interlinkage magnetic flux. Then, the electric current I2 to flow through the secondary coil 54 increases such that "Vd+r·I2" becomes equal to the voltage of the secondary coil 54.

Thus, by controlling the gradual increase rate of the absolute value of the electric current I1 to flow through the primary coil 52, it is possible to control the electric current I2 to flow through the secondary coil 54. In other words, it is possible to control the discharge current of the spark plug 28 for both the increase and the decrease.

The discharge control unit 86 operates the above time ratio D of the control switching element 80 for the feedback control of the discharge current value decided from the voltage drop Vi2 of the shunt resistor 58 to a discharge current command value I2*.

Here, the ignition communication line Li, the ignition coil 50, the spark plug 28, the ignition switching element 60, the diode 62, the control switching element 80 and the diode 82 shown in FIG. 2 are provided for each cylinder, but FIG. 2 shows only one representatively. Incidentally, in the embodiment, as for the waveform control communication line Lc, the booster circuit 70, the boost control unit 84 and discharge control unit 86, a single member is allocated for multiple cylinders. Then, depending on what cylinder the ignition signal Si input to the ignition apparatus 30 corresponds to, the discharge control unit 86 selects and operates the corresponding control switching element 80. Further, the boost control unit 84 performs the boost control, when the ignition signal Si for any cylinder is input to the ignition apparatus 30.

With a condition that the ignition signal Si is not input, the discharge control unit 86 controls the discharge current to the discharge current command value I2*, in a period after the elapse of a specified time from a falling edge of the ignition signal Si and before a falling edge of the discharge waveform control signal Sc. Then, as shown in FIG. 3, the discharge control unit 86 variably sets the discharge current command value I2*, depending on the delay time Td of the timing when the discharge waveform control signal Sc is input to the ignition apparatus 30 relative to the timing when the ignition signal Si is input to the ignition apparatus 30. Thereby, the ECU 40 can variably set the discharge current command value I2* by operating the delay time Td.

Figure 5:
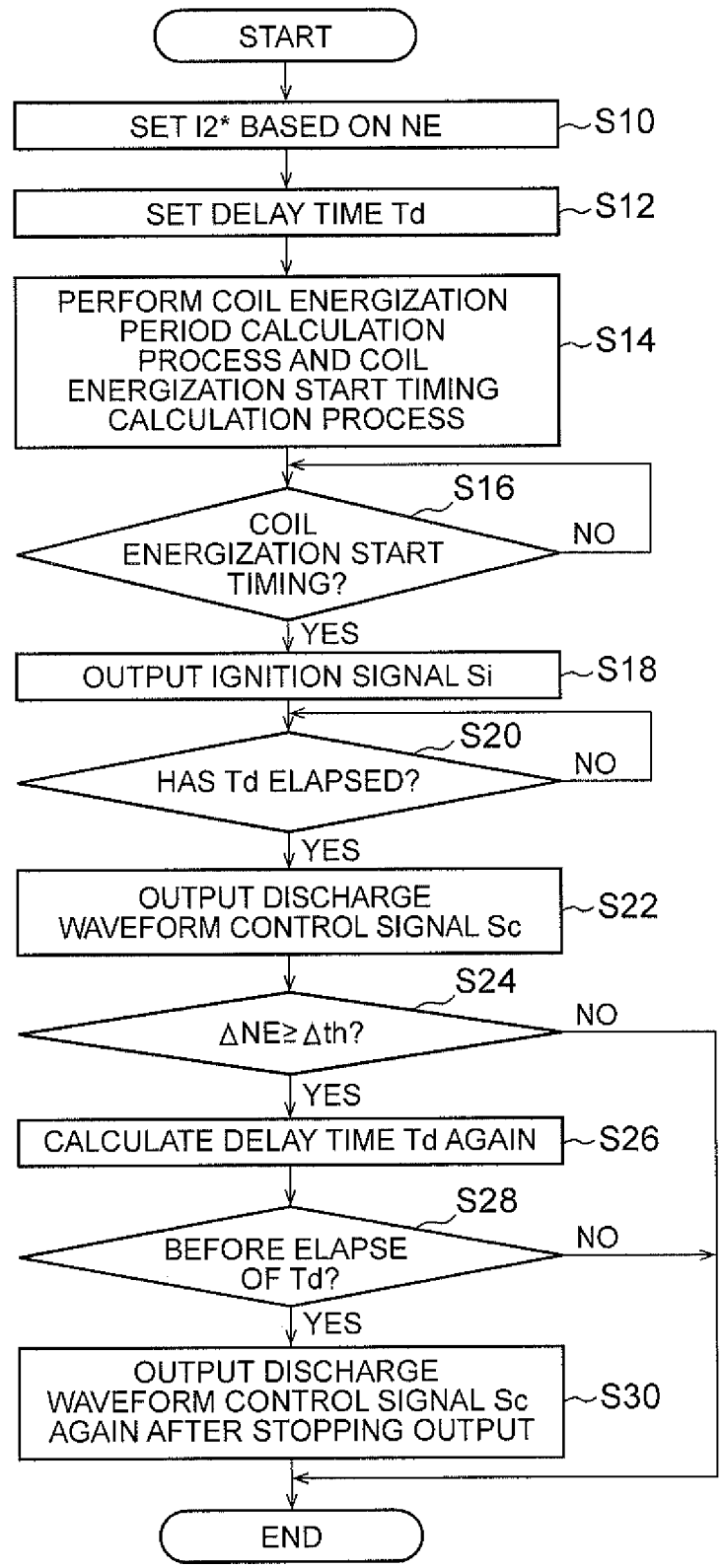
FIG. 5 is a flowchart showing a procedure of the ignition control according to the embodiment.

FIG. 5 shows a procedure of an ignition control in the second mode according to the embodiment. By the ECU 40, the process is executed repeatedly in a predetermined cycle, for example. In the series of processes, the ECU 40, first, sets the discharge current command value I2* based on the rotation speed NE (S10). Here, based on map data shown in FIG. 6, the discharge current command value I2* is set to a larger value as the rotation speed NE becomes higher. This is a setting in consideration of the fact that the airflow in the combustion chamber 24 becomes faster as the rotation speed NE becomes higher. When the airflow becomes fast, the discharge current of the spark plug 28 is carried by the airflow, and therefore, the ignitability is likely to decrease. Therefore, for suppressing the decrease in the ignitability, the discharge current command value I2* is set to a larger value. Here, the map data is data that specifies different discharge current command values I2* from each other for the respective values of three or more rotation speeds NE. The map data is previously stored in a storage device within the ECU 40.

Figures 6, 7, 8:
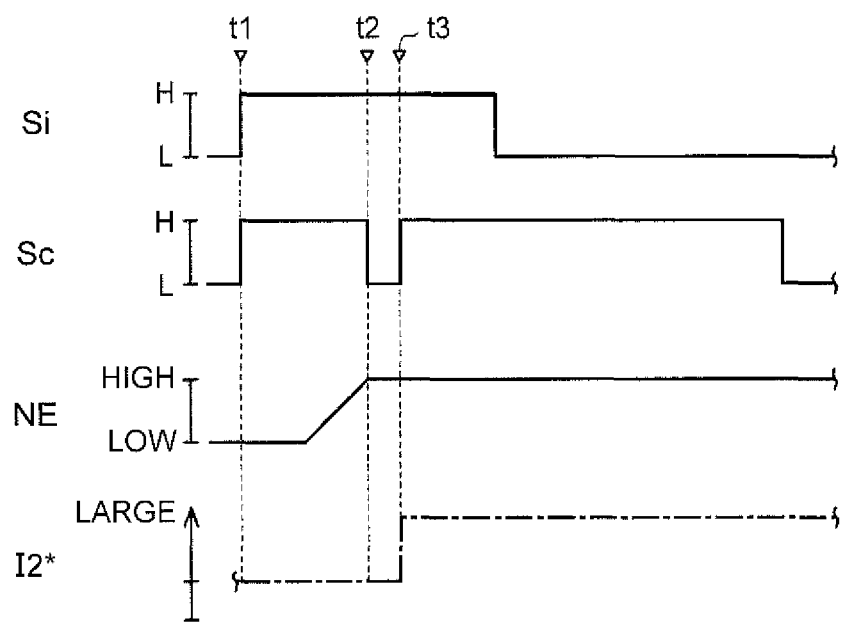
FIG. 6 is a diagram showing map data that specifies a relation between rotation speed and discharge current command value according to the embodiment.
FIG. 7 is a diagram showing map data that specifies a relation between the discharge current command value and delay time according to the embodiment.
FIG. 8 is a timing chart exemplifying the ignition control according to the embodiment.

Next, the ECU 40 sets the delay time Td (S12). Here, as shown in FIG. 7, the ECU 40 sets the delay time Td to a longer time as the discharge current command value I2* becomes larger. Here, the map data is data that specifies different delay times Td from each other for the respective values of three or more discharge current command values I2'. The map data is previously stored in a storage device within the ECU 40.

Next, the ECU 40 calculates an energization period of the primary coil 52, which is a closing operation period of the ignition switching element 60, and calculates an energization start timing of the primary coil 52, which is a turning-on operation timing of the ignition switching element 60 (S14). The energization start timing and the energization period decide a discharge start timing of the spark plug 28. In other word, the energization start timing and the energization period decide an ignition timing. Therefore, the energization start timing and the energization period are variably set based on a well-known parameter that decides the ignition timing.

Subsequently, the ECU 40 determines whether the current time is the energization start timing of the primary coil 52 set in the above step S14 (S16). Then, the ECU 40 waits until the energization start timing (S16: NO). In the case of determining that the current time is the energization start timing (S16: YES), the ECU 40 outputs the ignition signal Si to the ignition communication line Li (S18). After outputting the ignition signal Si, the ECU 40 waits until the delay time Td elapses (S20: NO). Then, in the case of determining that the delay time Td has elapsed (S20: YES), the ECU 40 outputs the discharge waveform control signal Sc to the waveform control communication line Lc (S22). Next, the ECU 40 determines whether a rise amount ΔNE of the rotation speed NE from the set timing in step S10 is a threshold Δth or more (S24), with a condition that the current time is in the output period of the ignition signal Si. The process is a process for determining whether the risk for the decrease in the ignitability is increased by the discharge current command value I2* decided from the above delay time Td for the discharge waveform control signal Sc that is currently being output.

In the case of determining that the rise amount ΔNE is the threshold Δth or more (S24: YES), the ECU 40 calculates the delay time Td again (S26), with a condition that the current time is in the output period of the ignition signal Si, because the risk for the decrease in the ignitability is high. Here, the discharge current command value I2* may be set from the map data shown in FIG. 6, depending on the rotation speed NE at the current time, and the delay time Td may be set from the map data shown in FIG. 7, depending on the discharge current command value I2*. However, without being limited to this, the rotation speed NE at the time of the discharge of the spark plug 28 may be predicted depending on the change rate of the rotation speed NE, and the delay time Td mat be set based on the predicted value.

Next, the ECU 40 determines whether the elapsed time from the output timing of the ignition signal Si is shorter than the newly set delay time Td, in other words, whether the current time is before the delay time Td (S28). Then, in the case of determining that the current time is before the delay time Td (S28: YES), the ECU 40 sets the electric potential of the waveform control communication line Le to the logic L by stopping the output of the discharge waveform control signal Sc once, with a condition that the current time is in the output period of the ignition signal Si. Thereafter, when the delay time Td has elapsed, the ECU 40 sets the electric potential of the waveform control communication line Le to the logic H by outputting the discharge waveform control signal Sc (S30).

Here, when the process of step S30 is completed, or when the negative determination is made in step S24 or S28, the ECU 40 finishes the series of processes shown in FIG. 5 once. While the ECU 40 performs the above processes, when the discharge waveform control signal Sc is input twice in a period during which the ignition signal Si is input, the ignition apparatus 30 updates the delay time Td calculated depending on the timing when the discharge waveform control signal Sc is input at the first time, based on the timing when the discharge waveform control signal Sc is input at the second time. Then, the ignition apparatus 30 sets the discharge current command value I2*, depending on the updated delay time Td.

Here, an action of the embodiment will be described with use of FIG. 8. FIG. 8 shows the transition of the ignition signal Si, the transition of the discharge waveform control signal Sc, the transition of the rotation speed NE, and the transition of the discharge waveform command value I2* that is recognized by the ignition apparatus 30.

In the example shown in FIG. 8, at time t1, the ECU 40 outputs the discharge waveform control signal Sc, simultaneously with the output of the ignition signal Si. Thereby, the delay time Td is set to zero, and therefore, the discharge control unit 86 of the ignition apparatus 30 sets the discharge current command value I2* to the minimum value. However, when the rotation speed NE rises after the output of the discharge waveform control signal Sc, the ECU 40, at time t2, stops the output of the discharge waveform control signal Sc once. Thereafter, at time t3, the ECU 40 outputs the discharge waveform control signal Sc again. Thereby, the ignition apparatus 30 updates the discharge current command value I2* to a value decided from the delay time of time t3 relative to time t1, which is the input timing of the ignition signal Si.

Here, when the rotation speed NE falls sharply after the output of the discharge waveform control signal Sc by the ECU 40, even if the ECU 40 stops the output of the discharge waveform control signal Sc and outputs the discharge waveform control signal Sc again, it is difficult to set the delay time Td, by the re-output timing, to a value that is appropriate to the rotation speed NE after the sharp fall. However, in this case, the discharge current command value I2* is set to a value that is larger than necessary, and therefore, the ignitability does not decrease.

Further, if the ECU 40 sets the delay time Td to a shorter time as the discharge current command value I2* becomes larger, it is difficult to update the discharge current command value I2* recognized by the ignition apparatus 30 to a proper value, when the rotation speed NE rises sharply after the output of the discharge waveform control signal Sc by the ECU 40.

According to the embodiment described above, the following effects are obtained. (1) The ECU 40 variably sets the delay time Td of the input timing of the discharge waveform control signal Sc to the ignition apparatus 30 relative to the input timing of the ignition signal Si to the ignition apparatus 30, and the discharge control unit 86 variably controls the discharge current value of the spark plug 28, depending on the delay time Td. Thereby, it is possible to suppress the increase in the number of communication lines, while allowing for the instruction of the discharge current command value I2* from the ECU 40 to the ignition apparatus 30.

(2) When the rotation speed NE of the internal combustion engine 10 is high, the delay time Td is set to a longer time than when the rotation speed NE of the internal combustion engine 10 is low. Thereby, even if the rotation speed NE rises sharply, the discharge control unit 86 can control the actual discharge current to a discharge current value that is appropriate to the rotation speed NE after the sharp rise.

(3) The internal combustion engine 10 gives motive power to the driving wheel of the vehicle. In this case, there is a fear that the rotation speed NE of the internal combustion engine 10 rises sharply at the time of the operation of a brake of the vehicle, the running on a rough road, or the like. Therefore, it is particularly effective that when the rotation speed NE of the internal combustion engine 10 is high, the delay time Td is set to a longer time than when the rotation speed NE of the internal combustion engine 10 is low.

Other Embodiments

Here, at least one of the matters of the above embodiment may be modified as follows. In the following, there are parts in which correspondence relations between matters described in the section "SUMMARY" and matters in the above embodiment are exemplified by reference characters and the like, but this does not intend to limit the above matters to the exemplified correspondence relations. Incidentally, the circuit shown on the left side of FIG. 4A corresponds to the first loop circuit, and the first loop circuit includes the battery 44, the primary coil 52 and the ignition switching element 60. Further, the circuit shown on the left side of FIG. 4C corresponds to the second loop circuit, and the second loop circuit includes the battery 44, the primary coil 52 and the booster circuit 70.

[Discharge Current Command Value]

The invention is not limited to a configuration in which the discharge current command value is variably set only depending on the rotation speed NE. For example, when the load is large, the discharge current command value may be set to a larger value than when the load is small. This is a setting in consideration of the fact that the ignitability decreases as the load becomes larger even if the rotation speed NE and the discharge current are identical. Here, as the load, for example, intake air volume can be employed.

[Delay Time]

The invention is not limited to a configuration in which when the delay time is long, a larger current value is commanded than when the delay time is short, and a smaller current value may be commanded. Even in this case, the finish timing of the control of the discharge current and the discharge current value are commanded through the single waveform control communication line Lc, and thereby, it is possible to reduce the number of communication lines.

[Discharge Waveform Control Signal]

The discharge waveform control signal is not limited to the pulse signal with the logic "H", and for example, may be a pulse signal with the logic "L". In this case, the discharge current value only need to be specified by the delay time of a falling edge of the discharge waveform control signal Sc relative to the input timing of the ignition signal Si to the ignition apparatus 30.

The invention is not limited to a configuration in which the discharge current command value I2* is changed in three or more stages depending on the delay time Td. For example, the discharge current command value I2* may be continuously increased as the delay time Td becomes longer. Further, for example, the discharge current command value I2* may be changed in two stages, depending on whether the delay time Td is a threshold or more.

[Ignition Signal]

The ignition signal is not limited to the pulse signal with the logic "H", and for example, may be a pulse signal with the logic "L".

[Ignition Switching Element]

The ignition switching element 60 may be disposed between the terminal TRM1 and the primary coil 52. In this case, even if the ignition signal Si is not input, the ignition switching element 60 is opened and closed in synchronization with the opening-closing operation of the control switching element 80, in a period during which the discharge waveform control signal Sc is input. Further, the ignition switching element may be configured by a MOS field-effect transistor.

[Discharge Control Circuit (70, 80 to 84)]

The control switching element 80 may be replaced with a pair of MOS field-effect transistors in which anodes or cathodes of body diodes are shorted out with each other, and the diode 82 may be removed. Further, an IGBT may be adopted.

In the above embodiment, the start timing of the control of the discharge current is the timing when the specified time has elapsed from the falling edge of the ignition signal Si, but the invention is not limited to this. For example, the start timing of the control may be the falling edge of the ignition signal Si.

The invention is not limited to a configuration in which the booster circuit 70 and the battery 44 are used for the application of the voltage to the primary coil 52. For example, the invention may include a circuit in which the battery 44 and the primary coil 52 can be connected such that a voltage with the reverse polarity to the polarity at the time of the closing operation of the ignition switching element 60 is applied to the primary coil 52.

The invention is not limited to a configuration in which the primary coil 52 is energized for the control of the discharge current of the spark plug 28. For example, differently from the primary coil 52, a third coil magnetically coupled with the secondary coil 54 may be energized. In this case, both ends of the third coil are insulated in a period during which the closing operation of the ignition switching element 60 is performed, and the same energization as the energization of the primary coil 52 in the above embodiments is performed after the opening operation of the ignition switching element 60.

[Discharge Control Unit]

The invention is not limited to a configuration of performing the feedback control of the detection value of the discharge current value to the discharge current command value I2*, and may adopt a configuration of performing the open loop control to the discharge current command value I2*. This can be actualized by variably setting the time ratio of the opening-closing operation of the control switching element 80 depending on the discharge current command value I2*.

[Booster Circuit]

The booster circuit is not limited to the boost chopper circuit, and may be a boost/buck chopper circuit. This can be actualized, for example, by replacing the diode 76 and the boost switching element 74 with MOS field-effect transistors. Then, if the opening-closing operations of the pair of MOS field-effect transistors are complementarily performed, even when the opening-closing operations are continued in the first mode in which the discharge waveform control signal Sc is not output, the charged voltage Vc of the capacitor 78 is restricted to a value decided by the time ratio, and therefore, an excessive voltage is suppressed.

[Ignition Apparatus]

The invention is not limited to a configuration in which the discharge of the spark plug 28 is not performed when the ignition switching element 60 is in the closed state. For example, in the closed state of the ignition switching element 60, the discharge may be performed from one electrode of the spark plug 28 to the other electrode, and by the opening operation of the ignition switching element 60, the discharge may be performed from the above other electrode to the one electrode by the counter electromotive force to be generated in the secondary coil 54. Even in this case, the decision of the discharge current command value depending on the above delay time Td is effective when the discharge current value is controlled after the start of the discharge from the other electrode to the one electrode.

[When Control of Discharge Current is Performed]

As the first mode in which the air-fuel ratio is richer than that in the second mode in which the control of the discharge current is executed, the invention is not limited to a configuration in which the air-fuel ratio is controlled to the theoretical air-fuel ratio. The air-fuel ratio may be richer than that, or may be leaner. In short, the air-fuel ratio only needs to be richer than that in the second mode.

Furthermore, the invention is not limited to a configuration in which the control of the discharge current is executed only in a period in which the air-fuel ratio is leaner than others. For example, at the time of a high rotation and a high load, the control of the discharge current may be executed, even when the target air-fuel ratio is set to the richest air-fuel ratio.

[Internal Combustion Engine]

The internal combustion engine is not limited to an internal combustion engine that gives motive power to the driving wheel of the vehicle, and may be an internal combustion engine that is mounted on a series hybrid vehicle, for example.

What is claimed is:

1. An ignition control system for an internal combustion engine, the ignition control system comprising:
an ignition apparatus including
an ignition coil that is provided with a primary coil and a secondary coil,
a spark plug that is connected with the secondary coil and that is exposed in a combustion chamber of the internal combustion engine,
a discharge control circuit that continues discharge of the spark plug after a start of the discharge of the spark plug, and
a discharge control unit that controls a discharge current of the spark plug by operating the discharge control circuit, after the start of the discharge of the spark plug;
a control apparatus;
an ignition communication line that transmits an ignition signal from the control apparatus to the ignition apparatus; and
a waveform control communication line that transmits a discharge waveform control signal from the control apparatus to the ignition apparatus, wherein
the ignition signal commands energization of the primary coil,
the discharge waveform control signal commands a finish timing of the control of the discharge current by the discharge control unit, by an input stop timing to the ignition apparatus,
the control apparatuses is configured to variably control a discharge current value by variably setting a delay time of an input timing of the discharge waveform control signal to the ignition apparatus relative to an input timing of the ignition signal to the ignition apparatus, the discharge current value being controlled by the discharge control unit depending on the delay time,
the discharge control unit is configured to control the discharge current value so that the discharge current value increases as the delay time increases, and the discharge current value decreases as the delay time decreases, and the control apparatus is configured to control the delay time so that the delay time increases as a rotation speed of the internal combustion engine increases and the delay time decreases as the rotation speed of the internal combustion engine decreases.

2. The ignition control system according to claim 1, wherein the discharge control unit is configured to control the discharge current value depending on the delay time of the input timing of the discharge waveform control signal relative to the input timing of the ignition signal, when the discharge waveform control signal is input twice to the ignition apparatus in a period during which the ignition signal is input to the ignition apparatus, the input timing of the discharge waveform control signal being a timing when the discharge waveform control signal is input at the second time, and the control apparatus is configured to output the discharge waveform control signal again after stopping output of the discharge waveform control signal, with a condition that the rotation speed of the internal combustion engine rises after the output of the discharge waveform control signal in an output period of the ignition signal.

3. The ignition control system according to claim 1, wherein the internal combustion engine gives motive power to a driving wheel of a vehicle having the internal combustion engine.

4. The ignition control system according to claim 1, wherein the ignition apparatus includes an ignition switching element that opens and closes a first loop circuit, the first loop circuit including the primary coil and an electric power source, the ignition signal commands a closing operation period of the ignition switching element, the discharge control circuit includes a control switching element that opens and closes a second loop circuit, the second loop circuit including the primary coil, the electric power source, and a booster circuit that boosts a voltage of the electric power source, the discharge control unit is configured to control the discharge current value by opening-closing operation of the control switching element, and the electric power source is connected with an identical terminal of the primary coil, in both of the first loop circuit and the second loop circuit.

\* \* \* \* \*